US009811838B1

(12) United States Patent
Daire et al.

(10) Patent No.: US 9,811,838 B1
(45) Date of Patent: Nov. 7, 2017

(54) UTILIZING A COMPUTING SYSTEM TO BATCH DELIVERIES FOR LOGISTICAL EFFICIENCY

(71) Applicant: Square, Inc., San Francisco, CA (US)

(72) Inventors: Kathryn Daire, Oakland, CA (US); Matthias Reichenbach, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/072,153

(22) Filed: Mar. 16, 2016

(51) Int. Cl.
G06Q 30/02 (2012.01)
G06Q 30/06 (2012.01)
G06Q 10/08 (2012.01)
G01S 19/13 (2010.01)

(52) U.S. Cl.
CPC ......... *G06Q 30/0222* (2013.01); *G01S 19/13* (2013.01); *G06Q 10/0835* (2013.01); *G06Q 30/0605* (2013.01); *G06Q 30/0635* (2013.01); *G06Q 30/0641* (2013.01)

(58) Field of Classification Search
CPC ................................................. G06Q 30/0261
USPC ........................................................ 705/14
See application file for complete search history.

(56) References Cited

U.S. PATENT DOCUMENTS

| | | | | |
|---|---|---|---|---|
| 8,626,609 B1* | 1/2014 | Vippagunta | ........ | G06Q 30/0601 705/26.1 |
| 9,269,103 B1* | 2/2016 | Kumar | ............... | G06Q 30/0605 |
| 9,430,777 B1* | 8/2016 | Strand | ................ | G06Q 30/0207 |
| 2002/0107820 A1* | 8/2002 | Huxter | ................. | G06Q 10/087 705/402 |
| 2002/0198818 A1* | 12/2002 | Scott | ................... | G06Q 10/0875 705/37 |
| 2003/0065574 A1* | 4/2003 | Lawrence | ............ | G06Q 10/087 705/26.82 |
| 2003/0200111 A1* | 10/2003 | Damji | .............. | G06Q 10/08345 705/335 |
| 2006/0041481 A1* | 2/2006 | Stowe | .................... | G06Q 10/06 705/16 |
| 2009/0254445 A1* | 10/2009 | Bennett | .................. | G06Q 10/08 705/26.1 |
| 2010/0114790 A1* | 5/2010 | Strimling | ............... | G06Q 30/06 705/330 |
| 2010/0125494 A1* | 5/2010 | Boss | ...................... | G06Q 10/08 705/14.19 |
| 2010/0250384 A1* | 9/2010 | Bhargava | ............. | G01C 21/343 705/26.1 |
| 2010/0325000 A1* | 12/2010 | Teraoka | ................. | G06Q 50/12 705/15 |

(Continued)

*Primary Examiner* — Matthew L Hamilton
(74) *Attorney, Agent, or Firm* — Mattingly & Malur, PC

(57) ABSTRACT

Techniques and arrangements for combining orders for items to be delivered to multiple buyers. Based on an indication of interest in a merchant by a first consumer, the first consumer and a nearby second consumer can be offered incentives to order from a same or nearby merchant in order to combine orders for delivery, thereby increasing the logistical efficiency of the deliveries. The indication of interest can be a commencement of an order, an indication that the first buyer "likes" a merchant, a search for the merchant, or other way to indicate an interest in the particular merchant. The incentives can include discounted delivery fees, discounted orders, and the like.

20 Claims, 9 Drawing Sheets

(56) References Cited

U.S. PATENT DOCUMENTS

| | | | |
|---|---|---|---|
| 2012/0173308 A1* | 7/2012 | Brown | G06Q 30/0207 705/14.1 |
| 2013/0006739 A1* | 1/2013 | Horvitz | G06Q 30/06 705/14.23 |
| 2013/0080280 A1* | 3/2013 | Scipioni | G06Q 10/06 705/26.1 |
| 2014/0095311 A1* | 4/2014 | Bulloch, Jr. | G06Q 30/02 705/14.55 |
| 2014/0279652 A1* | 9/2014 | Kim | G06Q 10/0833 705/333 |
| 2014/0279667 A1* | 9/2014 | Gillen | G06Q 10/0836 705/339 |
| 2014/0289031 A1* | 9/2014 | Comerford | G06Q 30/02 705/14.17 |
| 2014/0330739 A1* | 11/2014 | Falcone | G06Q 10/08355 705/338 |
| 2015/0161667 A1* | 6/2015 | Stevens | G06Q 30/0264 705/14.23 |
| 2015/0227888 A1* | 8/2015 | Levanon | G06Q 10/0834 705/334 |
| 2015/0294265 A1* | 10/2015 | Monteverde | G06Q 10/1097 705/333 |
| 2015/0294266 A1* | 10/2015 | Siragusa | G06Q 10/0833 705/333 |
| 2015/0294292 A1* | 10/2015 | Michishita | G06Q 50/12 705/15 |
| 2016/0063438 A1* | 3/2016 | Shuken | G06Q 10/08355 705/338 |
| 2016/0063583 A1* | 3/2016 | Nuthulapati | G06Q 30/0605 705/26.2 |
| 2016/0148287 A1* | 5/2016 | Bellavance | G06Q 30/0641 705/15 |
| 2016/0300184 A1* | 10/2016 | Zamer | G06Q 10/0834 |
| 2016/0300185 A1* | 10/2016 | Zamer | G06Q 10/0834 |

* cited by examiner

UTILIZING A COMPUTING SYSTEM TO BATCH DELIVERIES FOR LOGISTICAL EFFICIENCY

BACKGROUND

People have become increasingly busy with work, family, and other time-consuming activities. As such, people often do not have the time or energy to prepare food at home. However, sometimes people may not want to go to a restaurant, but instead may prefer to have food delivered to them. To meet this demand, a courier may deliver food prepared by a restaurant to a customer at a delivery location. For example, a service may enable customers to order food items from any of a variety of restaurants, and may arrange for a courier to deliver the food items from the restaurants to the customers. However, the single order from the customer delivered by a single courier can result in a tremendous added delivery expense for the customer and can be an inefficient use of courier time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
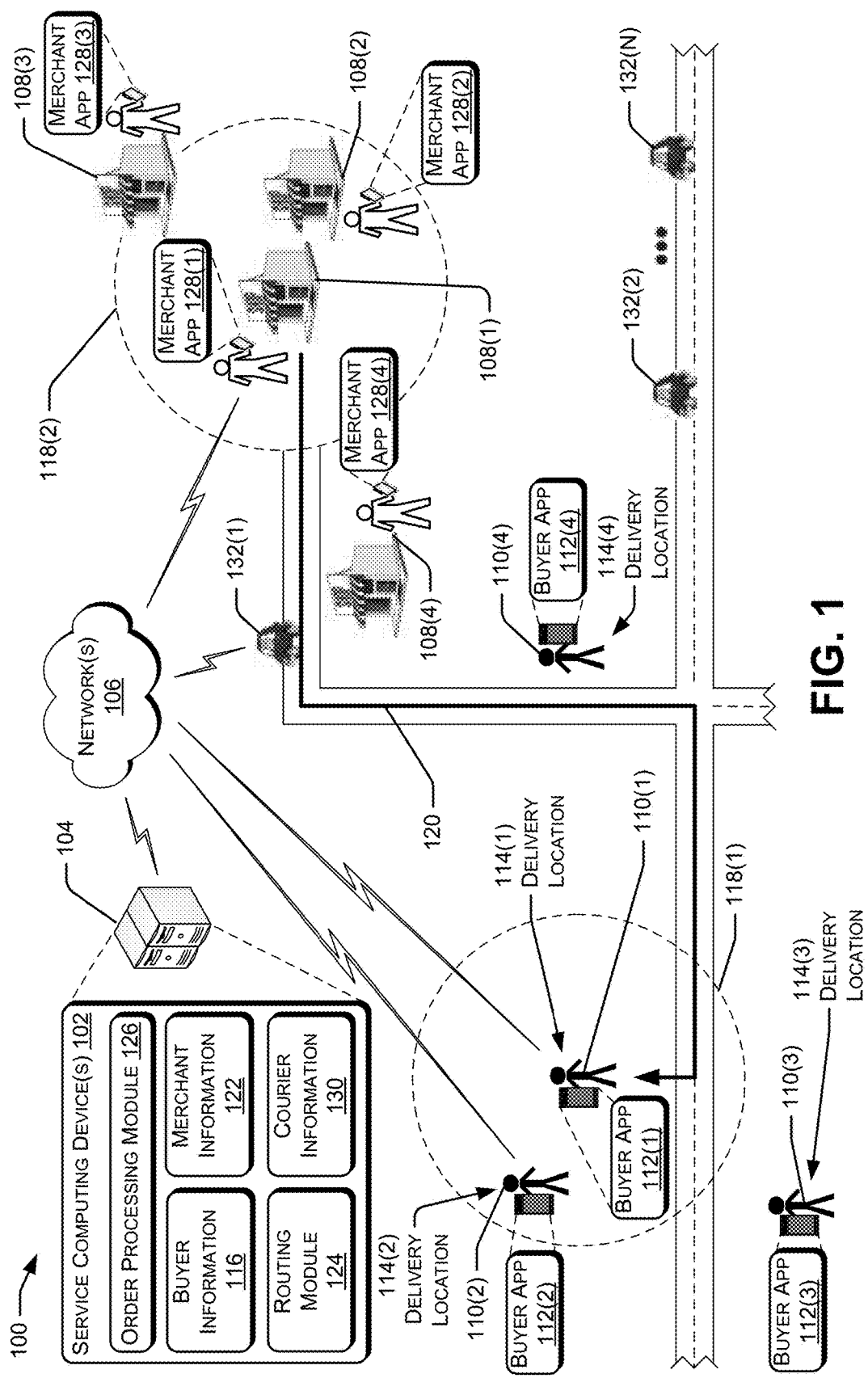
FIG. 1 illustrates an example environment in which delivery orders may be combined to increase logistical efficiency.

Some implementations described herein provide technological innovations within an ecosystem in which customers, who want to place orders for delivery, are encouraged and/or incentivized to participate in combined orders. In some examples, a first buyer may indicate an interest in ordering food. Based on the indication of interest, the first buyer and a second buyer located nearby the first buyer can be incentivized to order from a same or nearby restaurants in order to combine orders for delivery. The incentives can be based on a second buyer being in physical proximity and/or along a delivery route to the first buyer. The technology described herein employs a plurality of computing devices, mobile devices, and location sensors to provide technological arrangements that encourage buyers to order from a same or nearby merchant in order to combine orders, thereby increasing the logistical efficiency of the deliveries.

Some implementations described herein include techniques and arrangements for combining orders for items that are to be delivered to multiple buyers. In some examples, a first buyer may use an application on a first buyer device to indicate an interest in a particular merchant, such as a restaurant. The indication of interest can be a commencement of an order, an indication that the first buyer "likes" a merchant or an item offered by a merchant, a search for the merchant, or any other way to indicate an interest in the particular merchant In some examples, the application on the first buyer device can receive a completed order from the first buyer.

In various examples, based on the indication of interest and/or the completed order, a service provider can encourage a second buyer nearby to order from the particular merchant In such examples, the second buyer can be determined to be nearby when the second buyer is within a threshold distance of the first buyer and/or within a threshold distance from a point on a delivery route from the particular merchant to the first buyer.

In some examples, the service provider can encourage the second buyer to order from another merchant nearby the particular merchant in order to combine deliveries of the first and the second buyers. In such examples, the other merchant can be within a threshold distance from the particular merchant and/or within a threshold distance from a point on a delivery route from the particular merchant to the first buyer.

The service provider can provide the encouragement (e.g., an incentive) to the second buyer via a second buyer device, such as, for example, via a recommendation application, a push notification on a display, a text message, an email message, etc. The encouragement can be in the form of suggestion (e.g., surfacing a visual depiction of the merchant and/or popular goods therefrom), an incentive to order (e.g., a discount on delivery, a discount on goods, etc.), or other encouragement to engage in a transaction. Additionally, the service provider can present the first buyer with a same or similar encouragement to complete an order. In some examples, responsive to both the first and the second buyers ordering (e.g., completing a transaction) from the same or nearby merchants, the service provider can apply an incentive to one or both transactions.

As used herein, an order may include a request submitted by a buyer (e.g., a customer, a consumer, a buyer, etc.) for the acquisition of food items and/or other goods (referred to herein as items) from a merchant. The order information may be received by the service and sent to the merchant. For example, a merchant may include a restaurant or any other business or other entity engaged in the offering of items for delivery to buyers. Actions attributed to a merchant herein may include actions performed by employees or other agents of the merchant and, thus, no distinction is made herein between merchants and their employees unless specifically discussed. In addition, a buyer may include any entity that purchases items from a merchant. Buyers can be customers or potential customers of a particular merchant. The service can receive payment from a buyer for an order and the service can provide payment to the merchant for the order. Further, the service can provide payment to the courier for delivering the order.

For discussion purposes, example implementations, such as a buyer device running a recommendation application, are described below with reference to the corresponding figures. However, implementations herein are not limited to the buyer device running a recommendation application. The techniques discussed herein may be extended to other environments, other system architectures, other types of applications, and so forth, as will be apparent to those of skill in the art in light of the disclosure herein.

FIG. 1 illustrates an example environment 100 in which delivery orders can be combined to increase logistical efficiency. For instance, the environment 100 can enable one or more service-computing devices 102 of a service provider 104 to receive, over one or more networks 106, an indication of interest in a merchant 108 from a first buyer 110(1) via a first buyer application 112(1). The indication of interest can be determined based on a buyer action in the buyer application 112 (e.g., a recommendation application). The buyer action can be a commencement of an order with the merchant, an indication that the first buyer "likes" the merchant, a search for the merchant, or other way to indicate an interest in the merchant. Additionally, the service provider 104 can receive a delivery location 114(1) associated with the first buyer 110(1). The delivery location 114 can be a geolocation provided by a global positioning system (GPS) subsystem of a device associated with the buyer 110, an address provided by the buyer 110, a latitude and longitude provided by the buyer 110, and the like.

Based on the indication of interest from the first buyer 110(1) and the delivery location 114(1), the service provider 104 can identify one or more other buyers 110, such as a second buyer 110(2), located nearby the first buyer 110(1). In various examples, the second buyer 110(2) may be located nearby the first buyer 110(1) based on the second buyer 110(2) being within a threshold distance of the first buyer 110(1). In such examples, the threshold distance can be based on a geolocation associated with respective delivery locations 114. In various examples, the geolocation can be determined based on a global positioning system (GPS) signal and/or a non-GPS signal from the respective buyer devices. In some examples, the geolocation can be determined based on delivery information stored to a buyer profile in the buyer information database 116. In other examples, the geolocation can be a manual entry of the respective delivery locations 114, such as at the time of purchase.

In some examples, second buyer 110(2) may be located nearby the first buyer 110(1) based on the second delivery location 114(2) being located along a delivery route from the first merchant 108(1) to the first delivery location 114(1) and/or the first buyer 110(1). In various examples, the service provider may determine one or more delivery routes from the first merchant 108(1) to the first buyer 110(1), such as via a routing module 124 on the service-computing device 102. The one or more delivery routes can include route times. For example, a fastest route time may be estimated at 7 minutes, a second route time may be estimated at 8 minutes (e.g., +1 minute), and the like. The routing module 124 can access traffic, congestion, signaling, etc. to provide an accurate delivery estimate.

In some examples, the classification of a second buyer 110(2) being located nearby a first buyer 110(1) may be based on a time associated with the delivery route on which the second delivery location 114(2) is located. The time may be a threshold time over the fastest route time (e.g., less than +5 minutes, less than +3 minutes, etc.) and/or a threshold percentage of time over the fastest route time (e.g., less than +5%, less than +10%, etc.). For example, a second delivery location can be located along a delivery route that takes 6 minutes, one minute slower than a fastest route time of 5 minutes. With a threshold time being less than 3 minutes slower than the fastest delivery time, the second buyer 110(2) would be determined to be located nearby the first buyer 110(1). Conversely, with a threshold of the delivery route being less than 10% of the fastest delivery time, the second buyer 110(2) would not be determined to be nearby the first buyer 110(1).

In some examples, the service provider 104 can identify the second buyer 110(2) based on data saved to buyer information 116 on the service-computing device(s) 102, such as in a buyer profile. The buyer profile can include a delivery location 114 (e.g., a geolocation, an address, a neighborhood, etc.), preference information regarding particular merchants, merchant types, particular items offered by merchants, and the like. Based on the buyer profile, the service provider 104 can identify that a second buyer 110(2) is associated with a location nearby the first buyer 110(1), and/or prefers the merchant 108(1), a type associated with the merchant 108(1), and/or an item offered by the merchant 108(1).

In various examples, the service provider 104 can identify the second buyer 110(2) based on a second buyer application 112(1) being loaded onto and/or active (e.g., surfaced, executing, etc.) on a second buyer device. For example, the service provider 104 can recognize that the second buyer 110(2) is active on the second buyer application 112(2). The service provider 104 can identify a second delivery location 114(2), and can determine that the second buyer 110(2) is within a threshold distance 118(1) and/or along a delivery route 120 to the first buyer 110(1). In various examples, the service provider 104 can determine the second delivery location 114(2) based on a geolocation of the device associated with the second buyer 110(2), such as, for example, by GPS subsystem of the device.

In various examples, based on the identification of the second buyer 110(2), the service provider 104 can cause a representation of the merchant 108(1) to be surfaced via the second buyer application 112(2). The representation can include a visual depiction of the merchant 108(1), items available for purchase from the merchant 108(1) (e.g., pictures of menu items, list and/or description of menu items, etc.), a description of the merchant 108(1), location information associated with the merchant 108(1) (e.g., an address, a neighborhood, a visual depiction of the merchant 108(1) on a map, a route to the merchant 108(1), an estimated distance from the buyer, etc.), and/or other merchant information. Additionally or alternatively, the service provider 104 can cause representations of one or more merchants, such as merchants 108(2), 108(3) and/or 108(4) to be surfaced via the second buyer application 112(2). In various examples, the representations of the one or more merchants can be presented as thumbnail representations, providing a snap-shot of multiple merchants from which the second buyer 110(2) can order and still combine orders with one or more other buyers 110.

The representations can be surfaced based on a merchant location being within a threshold distance 118(2) of the merchant 108(1), such as merchants 108(2) and 108(3) and/or along a delivery route 120 from the merchant 108(1) to the first buyer 110(1), such as merchant 108(4). In various examples, the service provider 104 can store location information of each merchant 108 in a merchant information database 122 of the service-computing device 102. In some examples, the location information can be an address and/or a latitude and longitude associated with the merchant 108, and/or a geolocation provided by a GPS subsystem in a device associated with the merchant 108. For example, the merchant 108 can be a brick and mortar restaurant. In such an example, the location information stored in the merchant information database 122 would remain relatively constant. For another example, the merchant 108 can be a mobile food truck. In such examples, the location information could frequently change, and thus would be based on a GPS signal from a GPS subsystem of a device associated with the merchant 108.

In various examples, the representations can be surfaced based on promotional information stored in the merchant information database 122. In various examples, the promotional information can be based on a time elapsed since the merchant opened for business. For instance, the success of a new restaurant depends heavily on the patronage of the first month of operations. Thus, the service provider 104 can encourage buyers to order from new restaurants by surfacing a representation of the new restaurant, providing an incentive to ordering, etc. In some examples, the promotional information can be based on a merchant incentivizing an order during a traditionally slow time of the day. For example, a merchant can recognize that between the hours of 2 pm and 4 pm, business is traditionally slow. As such, the merchant can offer buyers coupons for placing orders during that time.

In various examples, the representations can be ranked for display via the second buyer application 112(2). In such examples, a representation of a top ranked merchant can be surfaced first, followed by a representation of a second ranked merchant, and so on. The ranking can be based on information stored in one or more databases of the service-computing device 102, such as in the buyer information database 116, the merchant information database 122. In some examples, the ranking can be based on information stored in a routing module 124. As an illustrative example, the routing module 124 can determine that a third merchant 108(3) is located closer to the first merchant 108(1), but is not located along the delivery route 120. Instead, the routing module 124 can determine that a fourth merchant 108(4) is slightly farther from the first merchant 108(1), but is along the delivery route 120. Thus, the routing module 124 may provide an indication that the fourth merchant 108(4) should be ranked higher than the third merchant 108(3).

Additionally or alternatively, the service provider 104 can rank the merchants 108 based on a buyer profile saved to a buyer information database 116 on the service-computing device(s) 102. In such examples, the service provider 104 can recognize that the buyer profile associated with the second buyer 110(2) includes preferences of a particular merchant 108, a merchant type, a particular item offered by the merchant, a preference of food associated with a particular neighborhood, and the like. Based on the information stored in the buyer profile, the service provider 104 can rank the merchants 108 and cause a display or representations of each merchant 108 in ranked order on the second buyer application 112(2).

In various examples, based on the identification of the second buyer 110(2), the service provider 104 can send a notification to the second buyer 110(2) that a first buyer 110(1) nearby has indicated an interest in the merchant 108(1). The notification can be sent via a push notification to a second buyer application 112(2), an email, a text message, or other way to notify the second buyer 110(2) of an existing interest in the merchant 108(1). In some examples, the notification can include an incentive (e.g., a reduced delivery fee, a discount for an item, a discount on the order, etc.) to order an item from the merchant 108. In some examples, the same or a similar incentive can be provided to the first buyer 110(1) to encourage placing an order with the merchant 108.

In the illustrated example, the service-computing device 102 includes an order processing module 126 configured to receive one or more orders from buyers 110. The order processing module 126 can receive orders from the buyers 110 and can associate the orders with information stored in the buyer information database 116, the merchant information database 122 and/or the routing module 124. Based on the information, the order processing module 126 can combine and process orders for nearby buyers 110 and/or nearby merchants 108 received via the buyer application 112.

In various examples, the order processing module 126 can access a merchant account in the merchant information database 122 to determine contact information for sending one or more orders to the merchant 108, such as via a merchant application 128 on a device associated with the merchant. The order processing module 126 can further access the merchant account to credit payment to the merchant that prepares the order. In some examples, the order processing module 126 can save the order to a buyer profile associated with the respective buyer 110.

Additionally, the order processing module 126 can access a courier information database 130 to determine courier contact information for sending combined orders to a particular courier 132(1) of a plurality of couriers 132(1)-132(N), such as to determine whether the courier 132(1) is willing to accept a delivery of combined orders. In various examples, the courier can user a courier application on a courier device to receive a message with information about the combined order, and to respond with acceptance of the delivery job. The courier 132(1) may subsequently pick up the combined order from the merchants 108, and deliver the orders to the respective buyers 110. The courier 132(1) can signal a successful delivery via the courier application, and the service-computing device 102 can process payment for the delivery. In various examples, the service-computing device 102 can receive delivery and/or courier ratings from the buyers 110. In such examples, the delivery and/or courier ratings can be saved to in the courier information database 130.

Figure 2:
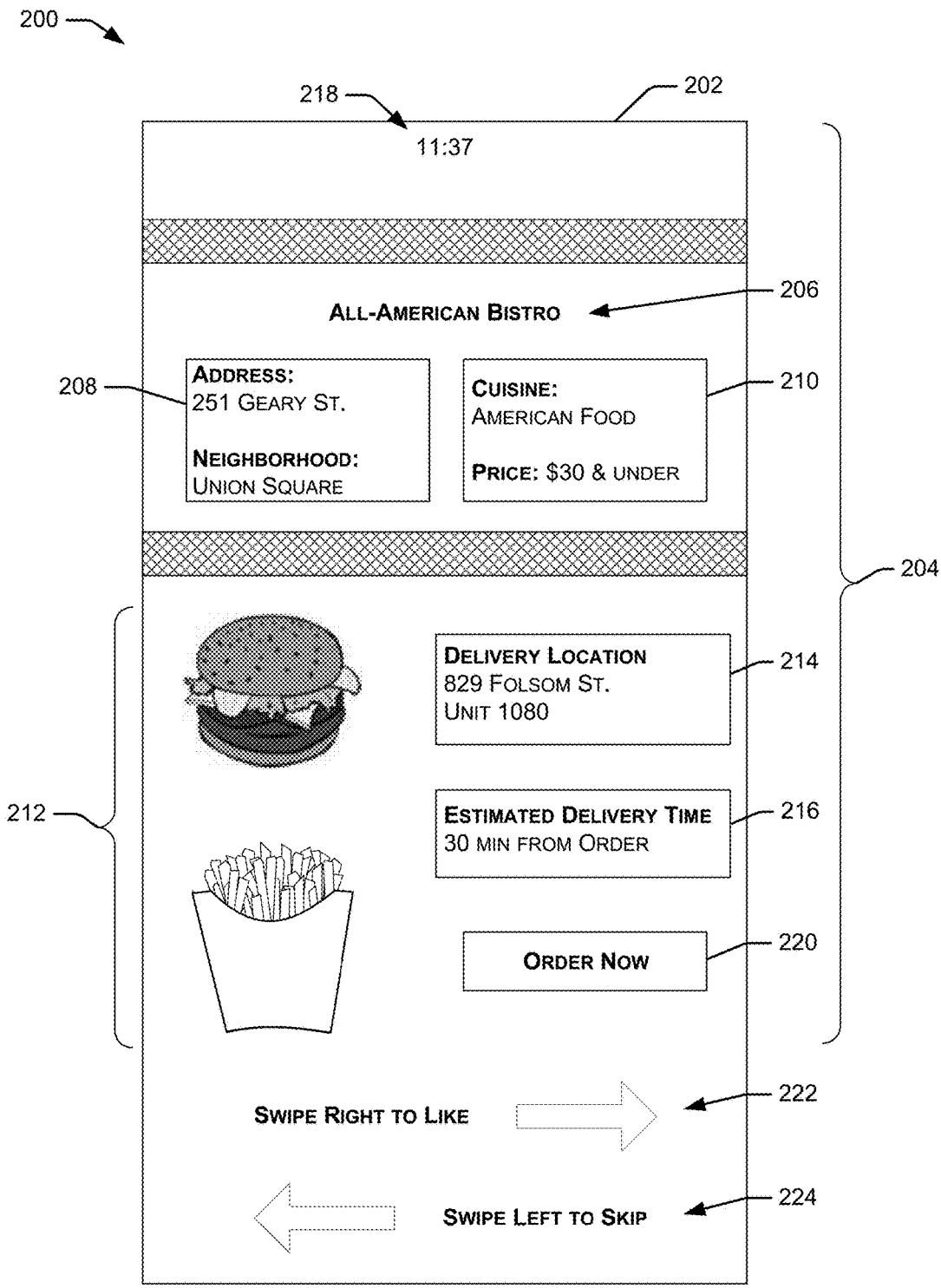
FIG. 2 illustrates an example graphical user interface of a recommendation application on a display associated with a buyer device according to some implementations.

FIG. 2 illustrates an example graphical user interface (GUI) 200 of a recommendation application, such as buyer application 12, on a display 202 associated with a buyer device according to some implementations. The GUI 200 presents information related to merchants participating in the recommendation application, such as in a representation 204 of a merchant. As illustrated, the representation 204 of the merchant can include a name 206, location information 208 (e.g., an address, a latitude and longitude, a neighborhood, etc.), general information 210 (e.g., type of items available for purchase, cost of items, etc.), and/or visual depictions 212 of the items available for purchase.

In various examples, the representations 204 can be surfaced on the GUI 200 based on a buyer profile stored in a buyer information database of a service-computing device and/or a buyer device. For example, a buyer can indicate a preference for eating burgers or American food, generally. For another example, a buyer can indicate a preference for a particular merchant, such as the All-American Bistro.

Based on the preference, the representation 204 of the merchant that provides the preferred items, can be surfaced first.

In some examples, the representations 204 can be surfaced on the GUI 200 based on promotional information stored in a merchant information database of the service-computing device. In various examples, the promotional information can be based on a time elapsed since the merchant opened for business, a merchant incentivizing an order, a courier offering a discount for delivery from the merchant, or other information. In various examples, the representations can be ranked for display based on the buyer profile, promotional information, a distance from the buyer, a route to the buyer, or other factors. In such examples, representation 204 of a top ranked merchant can be surfaced first, followed by a representation of a second ranked merchant, and so on.

In various examples, the representation 204 can include a delivery location 214 to which an order, if placed, would be delivered. In some examples, the delivery location 214 can be determined by the recommendation application based on a current location of the buyer device 202. For example, a current location can be determined from GPS information provided by an on-board GPS device, wireless access point information, cell tower information, and/or through various other techniques. In some examples, the delivery location 214 can be determined based on a buyer profile stored in a service-computing device, such as service-computing device 102 and/or on a data store on the buyer device. In such examples, the buyer can store the delivery location in a data store for regular use. In other examples, the GUI can provide a means by which a buyer can input a delivery location 214. For example, a buyer can want order food to be delivered to a friend's house prior to the buyer's arrival. Thus, in transit to the friend's house, the buyer can input an address for the delivery.

In various examples, the representation 204 can include an estimated delivery time 214. The estimated delivery time 214 can be determined based on a distance to the delivery location, a time of day, traffic en-route to the delivery location, how busy the merchant is, an average order preparation time, or other information related to a delivery time. In some examples, the GUI 200 can include a clock icon 218 on which a buyer can select a time associated with an order, such as for scheduling a future delivery time. In such examples, the estimated delivery time 214 can be adjusted to reflect an estimated time for delivery from order based on the designated order time.

As illustrated, the GUI 200 can include virtual controls through which a buyer can indicate an interest in a merchant to a service-computing device, such as service-computing device 102. In some examples, the indication of interest can be recognized by the service-computing device by a buyer commencing an order with the merchant represented on the GUI, such as by selecting an order now button 220. In some examples, the indication of interest can be recognized by the service-computing device based on an indication that the buyer "likes" the merchant In the illustrative example, the buyer indicates a "like" of the merchant by swiping right 222, and indicates a "dislike" of the merchant by swiping left 224. In other examples, the buyer can indicate a "like" and/or a "dislike" in a different way, such as, for example, by selecting a thumbs-up or thumbs-down icon, swiping up to like and down to dislike, or other ways in which a buyer can indicate a preference. In various examples, the preferences can be saved to the buyer profile in the service-computing device and/or the buyer device.

Figure 3:
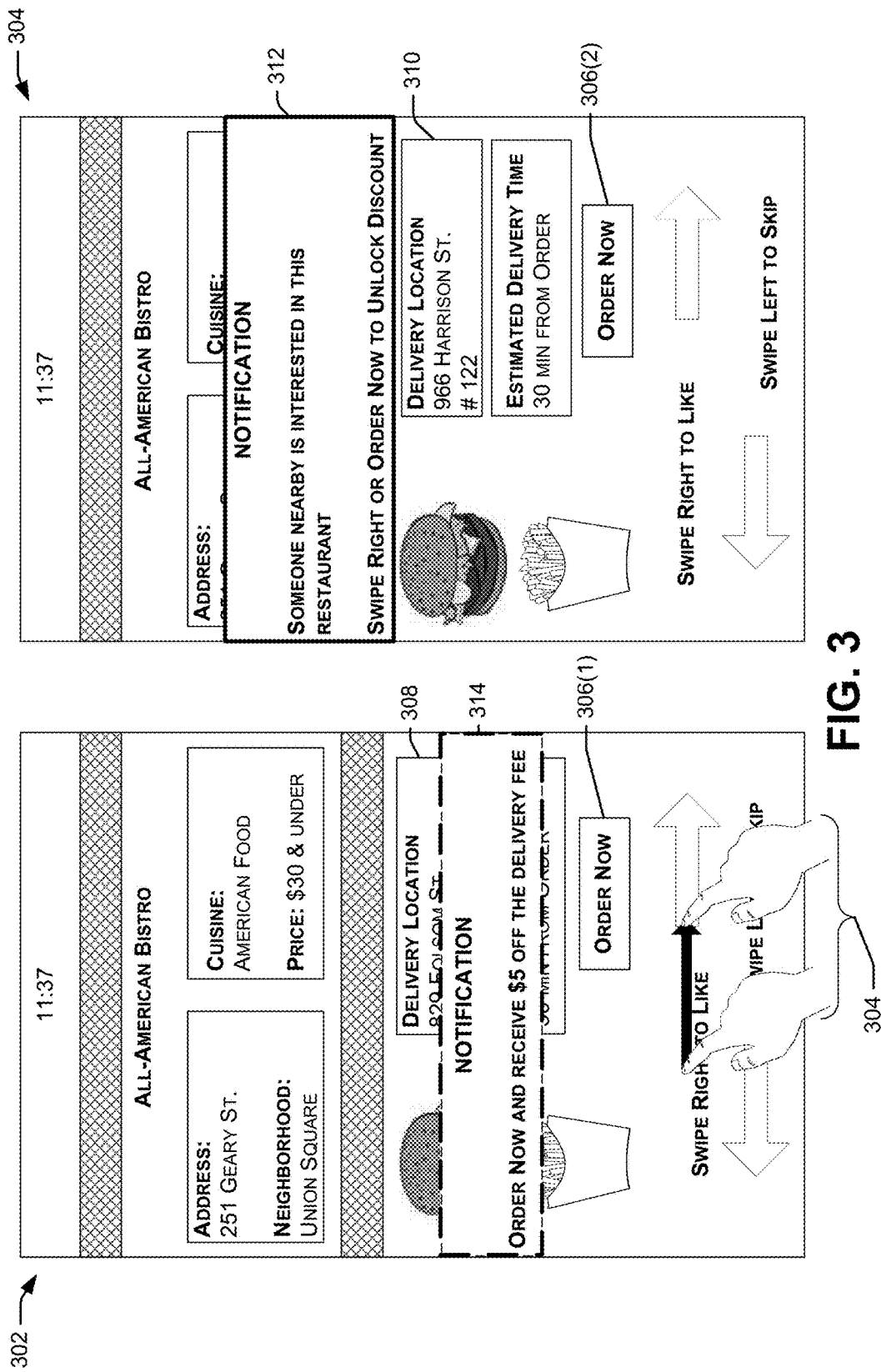
FIG. 3 illustrates an example of pre-purchase priming to encourage combined orders and improve logistical efficiency of the delivery, according to some implementations.

FIG. 3 illustrates an example of pre-purchase priming to encourage combined orders and improve a logistical efficiency of delivery, according to some implementations. As illustrated, the pre-purchase priming includes a first graphical user interface (GUI) 302 of a first buyer recommendation application on a display of a first buyer device and a second GUI 304 of a second buyer recommendation application on a display of a second buyer device.

In various examples, the first buyer can surface a first instance of a recommendation application, in a first GUI 302, such as GUI 200, in order to determine a merchant from which to place an order. In the illustrative example, the All-American Bistro restaurant is presented first, upon the buyer surfacing the application. As discussed above with reference to FIG. 2, the order in which merchant representations are surfaced can be based on buyer preferences, promotional information, a distance from the buyer, a route to the buyer, etc.

As illustrated, the first buyer can indicate an interest in the All-American Bistro by swiping to the right 304 on the first GUI 302. In other examples, the first buyer can indicate an interest in the merchant by selecting a "like" button, a thumbs-up icon, or other way to indicate a preference for the merchant In still yet other examples, the first buyer can indicate an interest in selecting an order now button 306.

Based on the indication of interest from the first buyer on first GUI 302 and a delivery location 308, the service provider can identify one or more other buyers, such as a second buyer, located nearby (e.g., within a threshold distance from, along a delivery route to, etc.) the first buyer. In various examples, the service provider can identify the second buyer based on data saved to a second buyer profile on a service-computing device. The second buyer profile can include a default delivery location (e.g., a geolocation, an address, a neighborhood, etc.), preference information regarding particular merchants, merchant types, particular items offered by merchants, notification information, and the like. For example, the second buyer profile may indicate a preference to be notified when other buyers nearby are interested in a restaurant designated as a favorite in the second buyer profile. Based on the buyer profile, the service provider can identify that a second buyer is associated with a location nearby the first buyer, and/or prefers the All-American Bistro, a type of food associated with the All-American Bistro, and/or an item offered by the All-American Bistro.

In some examples, the service provider can identify the second buyer based on a second buyer application being loaded onto and/or active (e.g., surfaced on the second buyer device) on a second buyer device. For example, the service provider can recognize that the second buyer is active on the second buyer application, and the second GUI 304 is being presented on a display of the second buyer device. The service provider can identify a delivery location 310 associated with the second buyer, and can determine that the second buyer is within a threshold distance and/or along a delivery route to the first buyer. In various examples, the service provide can determine the delivery location 310 based on a geolocation of the device associated with the second buyer, such as, for example, by GPS subsystem of the device. In other examples, the delivery location 310 can be a default location stored in the second buyer profile, or one manually entered by the second buyer in the second GUI 304.

In various examples, based on the identification of the second buyer, the service provider can cause a representation of the merchant to be surfaced on the second GUI 304.

As illustrated, the representation can include a visual depiction of the merchant, items available for purchase (e.g., pictures of menu items, list and/or description of menu items, etc.), a description of the merchant, location information associated with the merchant (e.g., an address, a neighborhood, a latitude and longitude, a visual depiction of the merchant on a map, a route to the merchant, an estimated distance from the buyer, etc.), and/or other merchant information.

In various examples, the service provider can cause representations of one or more other merchants to be surfaced on the second GUI 304 based at least in part on a distance of the one or more other merchants to the merchant in which the first buyer indicated an interest, the All-American Bistro. For example, representations of other restaurants within a threshold distance to the All-American Bistro, or along a delivery route from the All-American Bistro to the first buyer, can be surfaced on the second GUI 304. In some examples, the service provider can store location information of a plurality of merchants in a merchant information database of the service-computing device. The location information can include an address of the merchant, a latitude and longitude associated with the merchant, and/or a geolocation provided by a GPS subsystem in a merchant device. The service-computing device can keep updated information on nearby merchants to surface relevant representations to potentially combine orders and increase logistical efficiency of deliveries.

Additionally, the representations can be surfaced based on promotional information stored in the merchant information database. The promotional information can be based on a time elapsed since the merchant opened for business, a merchant incentivizing an order during a traditionally slow time of the day, a merchant participation in a promotional opportunity provided by the service provider, or other promotional situation.

In various examples, the representations can be ranked for display via the second GUI 304. In such examples, a representation of a top ranked merchant can be surfaced first, followed by a representation of a second ranked merchant, and so on. In various examples, the ranking can be based on information stored in one or more databases of the service-computing device and/or the second buyer device, such as in the second buyer profile. In some examples, the ranking can be based on the indication of interest from the first buyer in one or more merchants. In such examples, the service provider may rank "liked" merchants higher thereby surfacing the "liked" merchants before others on the second GUI 304.

In various examples, a notification of a first buyer interest 312 can be surfaced on the second GUI 304. The notification can include information that the first buyer is interested in the merchant, that the first buyer has recently ordered from the merchant, that a discount or incentive may be available to the second buyer, and other information to encourage the second buyer to purchase an item from the represented merchant In some examples, the notification can be sent via a push notification to a second buyer application, an email, a text message, or other way to notify the second buyer of a first buyer's interest in the merchant In some examples, the notification 312 can include an incentive (e.g., a reduced delivery fee, a discount for an item, a discount on the order, etc.) to order an item from the merchant In some examples, the same or a similar incentive 314 can be provided to the first buyer via the first GUI 302 to encourage placing an order with the merchant 108. The first buyer and the second buyer can select respective order now buttons 306(1) and 306(2), and can subsequently place respective orders.

The service provider can receive the orders from the first buyer and the second buyer via the service-computing device, and can process the orders. The service provider can subsequently combine the orders for nearby buyers and/or nearby merchants, and send the orders to the respective merchants. Additionally, the service provider can send the order information to a single courier to increase the logistical efficiency of the deliveries.

Figure 4:
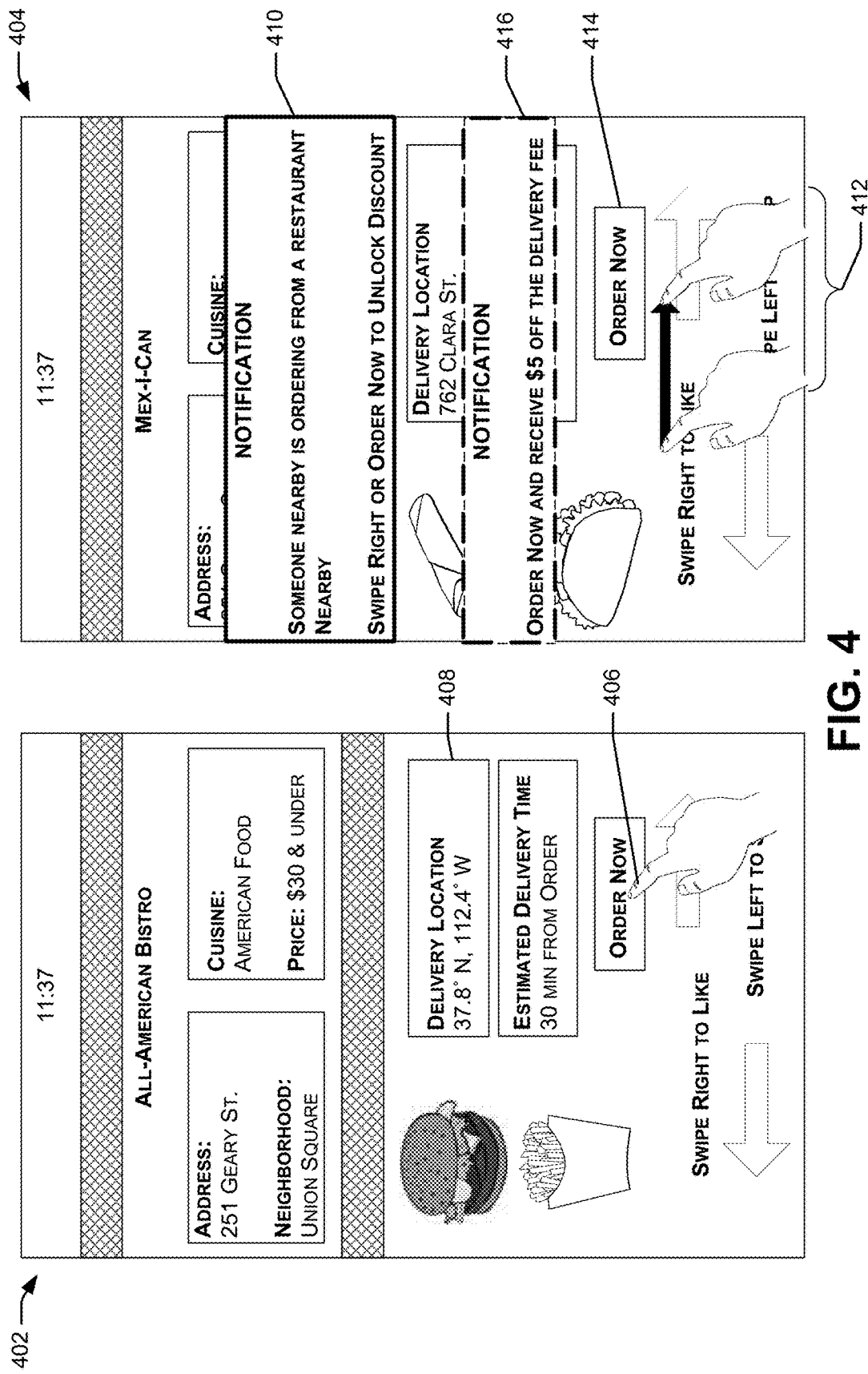
FIG. 4 illustrates an example of post-purchase priming to encourage combined orders and improve logistical efficiency of the delivery, according to some implementations

FIG. 4 illustrates an example of post-purchase priming to encourage combined orders and improve a logistical efficiency of delivery, according to some implementations. As illustrated the post-purchase priming includes a first graphical user interface (GUI) 402 of a first buyer recommendation application on a display of a first buyer device and a second GUI 404 of a second buyer recommendation application on a display of a second buyer device.

In various examples, the first buyer can surface a first instance of a recommendation application, in a first GUI 402, such as GUI 200 or GUI 302, in order to determine a merchant from which to place an order. Responsive to surfacing the recommendation application, a representation of the merchant may be displayed on the first GUI 402. As discussed above with reference to FIG. 2, the order in which merchant representations are surfaced can be based on buyer preferences, promotional information, a distance from the buyer, a route to the buyer, etc.

In the illustrative example, the first buyer indicates an interest in the merchant by commencing an order, such as by selecting an order now button 406. In other examples, the first buyer can indicate an interest in the merchant by selecting a "like" button, a thumbs-up icon, or other way to indicate a preference for the merchant.

Based on the indication of interest from the first buyer on first GUI 402 and a delivery location 408, the service provider can identify one or more other buyers, such as a second buyer, located nearby (e.g., within a threshold distance from, along a delivery route to, etc.) the first buyer. In various examples, the service provider can identify the second buyer based on data saved to a second buyer profile on a service-computing device. The second buyer profile can include a default delivery location (e.g., a geolocation, an address, a neighborhood, etc.), preference information regarding particular merchants, merchant types, particular items offered by merchants, notification information, and the like. For example, the second buyer profile may indicate a preference to be notified when other buyers nearby are interested and/or ordering from in a restaurant located nearby a favorite restaurant in the second buyer profile, such as Mex-I-Can. Based on the buyer profile, the service provider can identify that a second buyer is associated with a location nearby the first buyer, and/or prefers the restaurant Mex-I-Can, which is within a threshold distance and/or along a delivery route from a merchant from which the first buyer has commenced an order.

In some examples, the service provider can identify the second buyer based on a second buyer application being loaded onto and/or active (e.g., surfaced on the second buyer device) on a second buyer device. For example, the service provider can recognize that the second buyer is active on the second buyer application, and the second GUI 404 is being presented on a display of the second buyer device.

In various examples, based on the identification of the second buyer, and the commencement of the order by the first buyer, the service provider can cause a representation of Mex-I-Can to be surfaced on the second GUI 404. As illustrated, the representation can include a visual depiction of the merchant, items available for purchase (e.g., pictures of menu items, list and/or description of menu items, etc.), a description of the merchant, location information associated with the merchant (e.g., an address, a neighborhood, a latitude and longitude, a visual depiction of the merchant on a map, a route to the merchant, an estimated distance from the buyer, etc.), and/or other merchant information.

In various examples, the service provider can cause representations of one or more other merchants to be surfaced on the second GUI 404 based at least in part on a distance from the merchant in from which the first buyer ordered, the All-American Bistro, to the one or more other merchants In various examples, the representations can also be surfaced based on promotional information stored in the merchant information database. The promotional information can be based on a time elapsed since the merchant opened for business, a merchant incentivizing an order during a traditionally slow time of the day, a merchant participation in a promotional opportunity provided by the service provider, or other promotional situation.

In various examples, the representations can be ranked for display via the second GUI 404. In such examples, a representation of a top ranked merchant can be surfaced first, followed by a representation of a second ranked merchant, and so on. In various examples, the ranking can be based on preference information stored in a second buyer profile, such as a favorite restaurant, a previously "liked" restaurant, and the like.

In various examples, a notification 410 indicating that a first buyer has commenced an order can be surfaced on the second GUI 404. The notification can include information that the first buyer is ordering from a merchant nearby a favorite merchant of the second buyer, that a discount or incentive may be available to the second buyer, and other information to encourage the second buyer to purchase an item from the represented merchant In some examples, the notification can be sent via a push notification to the second recommendation application, an email, a text message, or other way to notify the second buyer of a first buyer's order.

In various examples, a second buyer may indicate an interest in the represented merchant, Mex-I-Can. The indication of interest can be a swipe to "like" 412 or other way to indicate a preference, and/or a selection of an order now button 414. Based on an indication of interest from the second buyer, the service provider can surface an incentive 416 (e.g., a reduced delivery fee, a discount for an item, a discount on the order, etc.) to order an item from the represented merchant In some examples, the same or a similar incentive 416 can be provided to the first buyer via the first GUI 302 to encourage placing an order with the merchant 108. The service provider can receive an order from the second buyer via the second GUI 404, and can subsequently combine the second order with the first order placed by the first buyer. The service provider can process the orders, apply incentives, and send the orders to respective merchants. Additionally, the service provider can send the order information to a single courier to increase the logistical efficiency of the deliveries.

Figure 5:
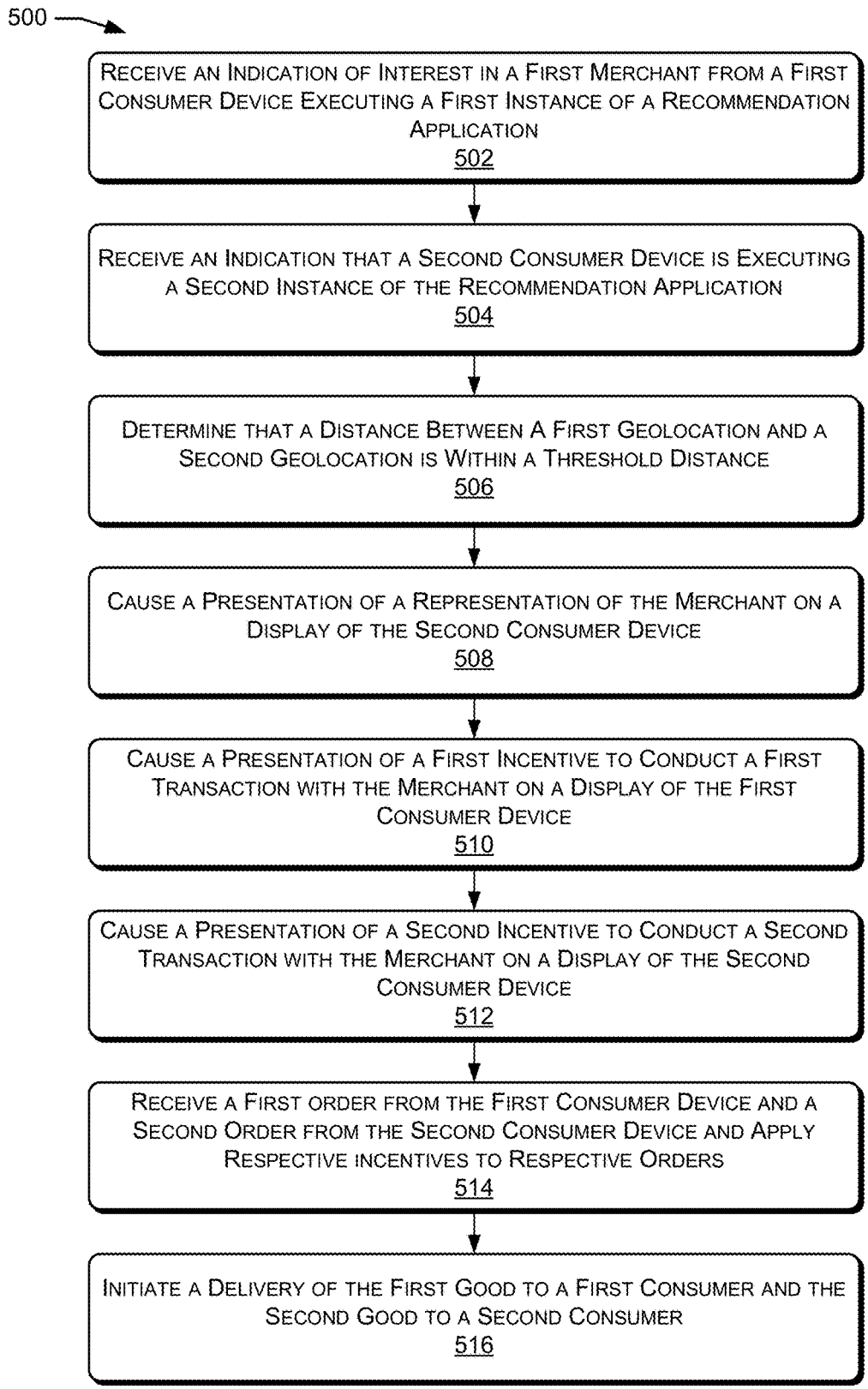
FIG. 5 illustrates a flow diagram of an example process of pre-purchase priming to encourage combined deliveries to increase logistical efficiency.

FIG. 5 illustrates a flow diagram of an example process 500 of pre-purchase priming to encourage combined deliveries to increase logistical efficiency.

At 502, a service-computing device receives an indication of interest in a merchant from a first consumer device executing a first instance of a recommendation application. The indication of interest can be determined based on a consumer action on a user interface of the recommendation application. The consumer action can be a commencement of an order with the merchant, an indication that the first consumer "likes" the merchant, a search for the merchant, or other way to indicate an interest in the merchant.

At 504, the service-computing device receives an indication that a second consumer device is executing a second instance of the recommendation application. In some examples, the indication is received when the recommendation application is loaded onto, but inactive on a second consumer device. In other examples, the indication is received when the recommendation application is active on the second consumer device.

At 506, the service-computing device determines that a first geolocation of the first consumer device is within a threshold distance of a second geolocation of the second consumer device. In some examples, the first geolocation and the second geolocation can be based on a global positioning system (GPS) signal from a GPS subsystem in the respective devices. In other examples, the first geolocation and the second geolocation can be based on a delivery location provided by the respective consumer, such as via the user interface of the recommendation application and/or stored in a consumer profile.

The threshold distance may be determined based on various factors involved in a delivery, such as traffic, congestion, a number of orders being processed by the system at a given time, and the like. As such, the threshold distance may be measured based on city blocks, kilometers, miles, or other type of distance measurement. For example, in a busy city, such as San Francisco, a threshold distance may be 4 city blocks. Conversely, in a rural town, such as Yreka, the threshold distance may be 2 miles.

At 508, the service-computing device causes a presentation of a representation of the merchant on a display of the second consumer device. The representation can include a visual depiction of the merchant, items available for purchase from the merchant (e.g., pictures of menu items, list and/or description of menu items, etc.), a description of the merchant, location information associated with the merchant (e.g., an address, a neighborhood, a visual depiction of the merchant on a map, a route to the merchant, an estimated distance from the consumer, etc.), and/or other merchant information.

At 510, the service-computing device causes a presentation of a first incentive to conduct a first transaction with the merchant to the first consumer device. The first incentive can include an offer for a reduced delivery fee, a discount for an item, a discount on the order, or other method to encourage the second consumer to conduct the transaction.

At 512, the service-computing device causes a presentation of a second incentive to conduct a second transaction with the merchant to the second consumer device. The second incentive can include an offer for a reduced delivery fee, a discount for an item, a discount on the order, or other method to encourage the second consumer to conduct the transaction. In some examples, the first incentive and the second incentive can be identical incentives. In other examples, the first incentive and the second incentive can be different incentives. In such examples, the incentives may differ based in part on a need to encourage one consumer more than the other consumer.

At 514, the service-computing device receives a first order from a first consumer device and a second order from a second consumer device and applies the respective incentives to the respective orders. In examples in which the first transaction and the second transaction are with a same merchant, the transactions may be combined and sent to the merchant substantially simultaneously. In examples in which the first transaction and the second transactions are with different merchants, each transaction can be sent to the respective merchant for further processing.

At 516, the service-computing device initiates a delivery of a first good to a first consumer and a second good to a second consumer. The service-computing device can combine the first and the second transactions into a single delivery order to send to a courier. The service-computing device can send the delivery order to the courier via a courier device connected to the service-computing device via a network connection. The delivery order can include details regarding each transaction to specify that the first good is to be delivered to the first consumer and the second good to the second consumer. Though described as merely a first transaction and a second transaction, the service-computing device can combine a plurality of transactions and send the data to a single courier for delivery.

Figure 6:
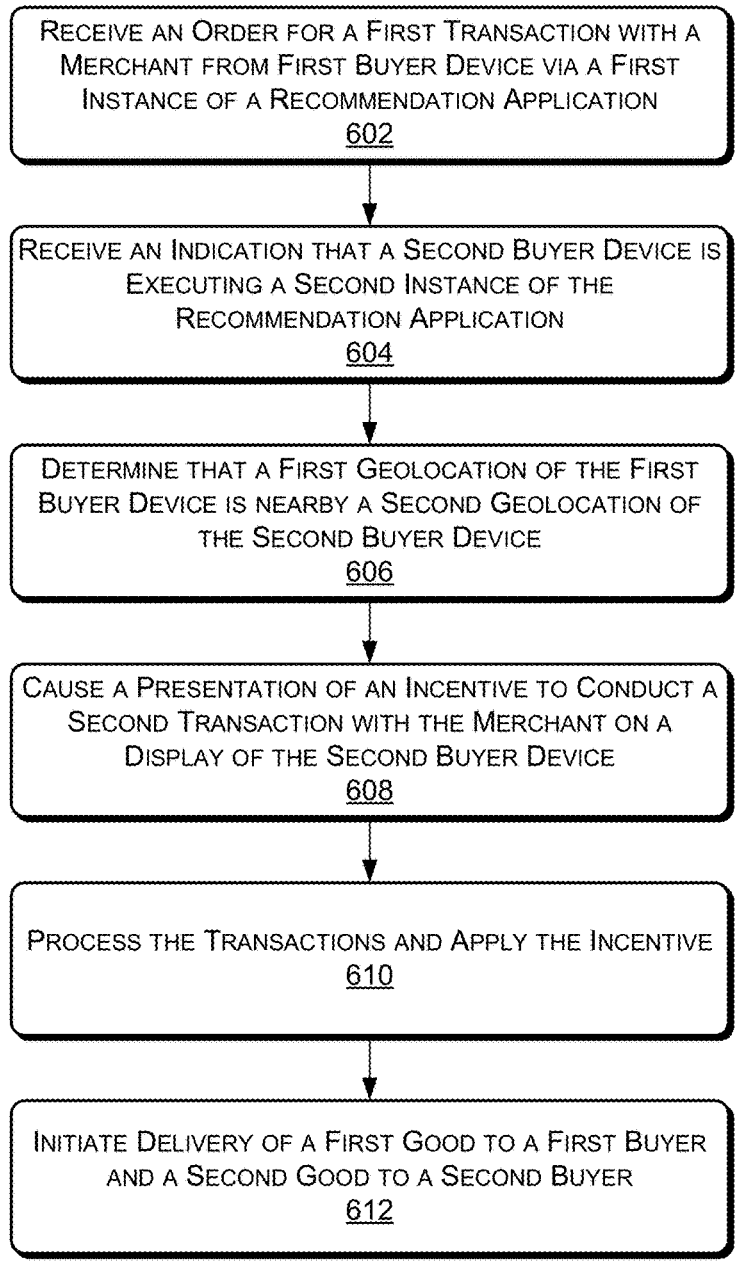
FIG. 6 illustrates a flow diagram of an example process of post-purchase priming to encourage combined deliveries to increase logistical efficiency.

FIG. 6 illustrates a flow diagram of an example process 600 of post-purchase priming to encourage incentivizing combined deliveries to increase logistical efficiency.

At 602, a service-computing device receives an order for a first transaction with a first merchant from a first buyer (e.g., customer, consumer, etc.) device via a first instance of a recommendation application (e.g., a buyer application).

At 604, the service-computing device receives an indication that a second buyer is executing a second instance of the recommendation application. In some examples, the indication can be received when the recommendation application is loaded onto, but inactive on a second buyer device. In other examples, the indication can be sent when the recommendation application is active on the second buyer device.

At 606, the service-computing device determines that a first geolocation of the first buyer device is nearby a second geolocation of the second buyer device. In some examples, the first geolocation and the second geolocation can be based on a global positioning system (GPS) signal from a GPS subsystem in the respective devices. In other examples, the first geolocation and the second geolocation can be based on a delivery location provided by the respective buyer, such as via a user interface on the buyer device and/or stored in a buyer profile.

In various examples, the first geolocation is nearby the second geolocation when the geolocations are within a threshold distance of one another. The threshold distance may be determined based on various factors involved in a delivery, such as traffic, congestion, a number of orders being processed by the system at a given time. As such, the threshold distance may be measured based on city blocks, kilometers, miles, or other type of distance measurement. For example, in a busy city, a threshold distance may be 5 city blocks. Conversely, in a small town, the threshold distance may be 3 miles.

In some examples, the first geolocation is nearby the second geolocation when the second geolocation is located along a delivery route from a selected merchant to the first geolocation. In such examples, a service-computing device may calculate one or more delivery routes between the first buyer and a merchant in which the first buyer indicates interest. The service-computing device may identify the second geolocation to be along one of the one or more delivery routes, thereby enabling a combination of order to increase the logistical efficiency of delivery. In various examples, the determination that a geolocation is located along one of the one or more delivery routes can be based on a threshold time over the fastest route. The threshold time can be based on minutes and/or a percentage of a time required for the fastest route. For example, a second geolocation can be determined to be nearby a first geolocation when the second geolocation is located along a route that is 3 minutes slower than the fastest delivery route. For another example, a second geolocation can be determined to be nearby a first geolocation when the second geolocation is along a route that is 5% slower than the fastest route.

At 608, the service-computing device causes a presentation of an incentive to conduct a second transaction with the first merchant on a display of the second buyer device. The incentive can include an offer for a reduced delivery fee, a discount for an item, a discount on the order, or other method to encourage the second buyer to conduct the transaction. In some examples, the same or a similar incentive can be provided to the first buyer.

At 610, the service-computing device processes the first and the second transactions and applies the incentive to the respective transaction. In examples in which the first transaction and the second transaction are with a same merchant, the transactions may be combined and sent to the merchant substantially simultaneously. In examples in which the first transaction and the second transactions are with different merchants, each transaction can be sent to the respective merchant for further processing.

At 612, the service-computing device initiates the delivery of a first good to a first buyer and a second good to a second buyer. The service-computing device can combine the first and the second transactions into a single delivery order to send to a courier. The service-computing device can send the delivery order to the courier via a courier device connected to the service-computing device via a network connection. The delivery order can include details regarding each transaction to specify that the first good is to be delivered to the first buyer and the second good to the second buyer. Though described as merely a first transaction and a second transaction, the service-computing device can combine a plurality of transactions and send the data to a single courier for delivery.

Figure 7:
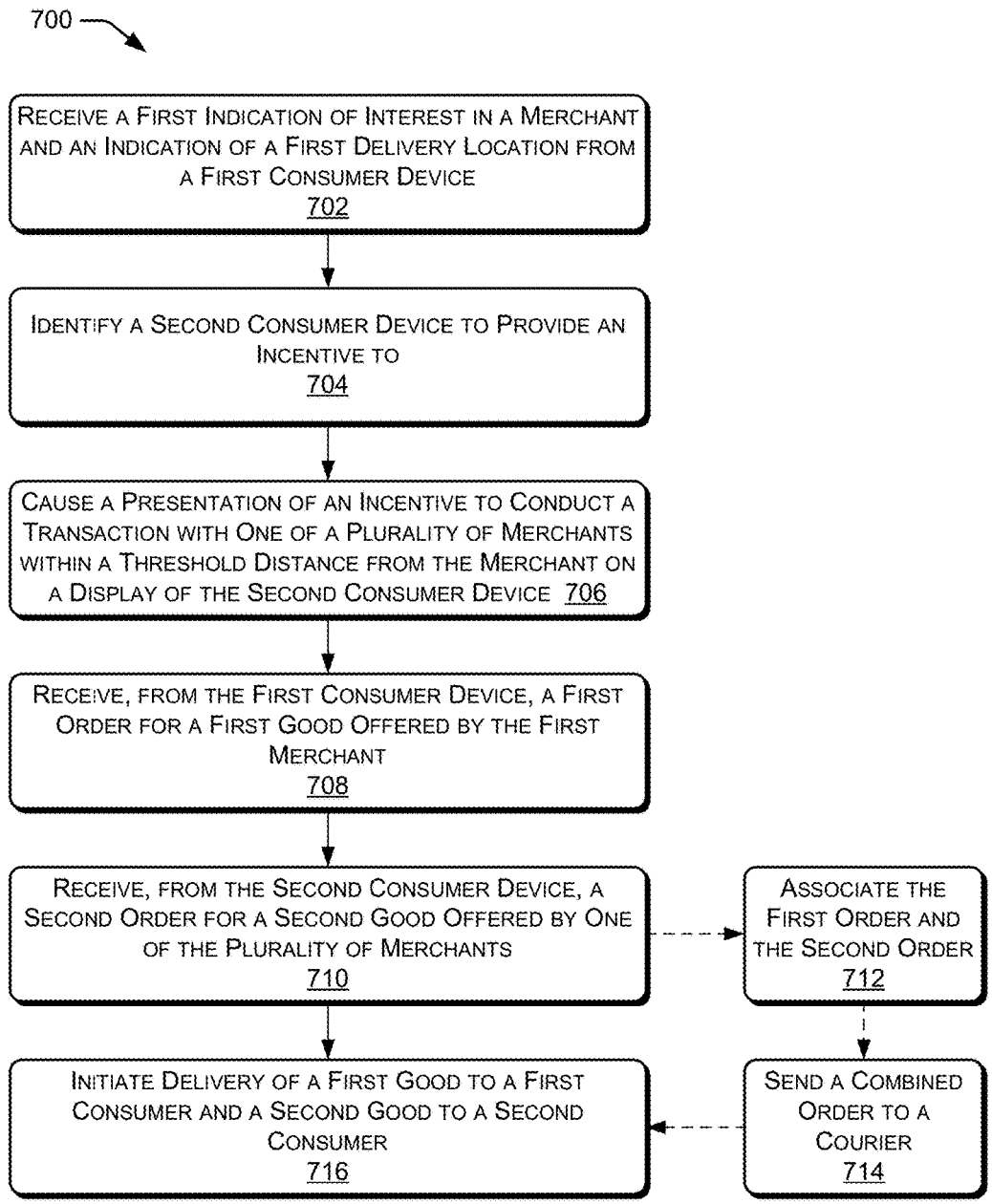
FIG. 7 illustrates a flow diagram of an example process for incentivizing combined deliveries to increase logistical efficiency.

FIG. 7 illustrates a flow diagram of an example process 700 for incentivizing combined deliveries to increase logistical efficiency.

At 702, a service-computing device receives an indication of interest in a merchant and an indication of a first delivery location from first consumer device. In various examples, the indication of interest may be received via a first instance of a recommendation application. The indication of interest can be determined based on a consumer (e.g., a buyer, a customer, etc.) action on a user interface of the recommendation application. The consumer action can be a commencement of an order with the merchant, an indication that the first consumer "likes" the merchant, a search for the merchant, or other way to indicate an interest in the merchant.

In various examples, the indication of the first delivery location can be a geolocation of the first consumer device. In such examples, the geolocation can be determined based on a global positioning system (GPS) signal from a GPS subsystem of the first consumer devices, and/or by non-GPS location services of the first consumer device. In some examples, the indication of the first delivery location can be based on an input of a delivery location, such as an address, a latitude and longitude, and the like. The input can be stored in a consumer profile associated with the first consumer or input substantially simultaneously with the indication of interest.

At 704, the service-computing device identifies a second consumer device to provide an incentive to. The service-computing device can identify the second consumer device based at least in part on an indication that the second consumer device is located nearby the first consumer device. In various examples, the service-computing device identifies the second consumer device is nearby the first consumer device based on respective geolocations of the second consumer device and the first consumer device. In such examples, the respective geolocations can be determined based on GPS signal from a GPS subsystem in the respective devices, and/or by non-GPS location services. In some examples, the service-computing device determines that the second consumer device is located nearby the first delivery location based on respective input geolocations of the second consumer device and the first delivery location, such as via a user interface on the respective consumer devices and/or stored in respective consumer profiles. For example, the first consumer may input an address in the Soho neighborhood as the first delivery location. The service-computing device may recognize the Soho neighborhood as being associated with a second consumer profile, and thus may determine that the first consumer device and the second consumer device are nearby.

In various examples, the service-computing device may determine that the second consumer device is located nearby the first delivery location based upon the second consumer device being within a threshold distance of the first delivery location, or vice versa. The threshold distance may be determined based on various factors involved in a delivery, such as traffic, congestion, a number of orders being processed by the system at a given time, etc. As such, the threshold distance may be measured based on city blocks, kilometers, miles, or other type of distance measurement. For example, in a busy city, a threshold distance may be 4 city blocks. Conversely, in a rural town, the threshold distance may be 2 miles.

In some examples, the service-computing device may determine that the second consumer device is located nearby the first delivery location based upon the second consumer device being located along a delivery route from a selected merchant to the first delivery location. In such examples, a service-computing device may calculate a preferred route between the first consumer and the merchant in which the first consumer indicates interest. The service-computing device may identify the second consumer device to be along the preferred route, thereby enabling a combination of order to increase a logistical efficiency of delivery.

At 706, the service-computing device can cause a presentation of an incentive to conduct a transaction with one of a plurality of merchants located a threshold distance from the merchant. The incentive can include a reduced delivery fee, a discount for an item, a discount on the order, or other way to encourage the second consumer to conduct a transaction with the merchant and/or a second merchant located nearby the merchant In some examples, the incentive can be provided to the second consumer device based on an indication of interest from the second consumer in conducting a second transaction. For example, a second consumer may receive the notification of the first consumer's indication of interest, and may surface a second instance of the recommendation application. The second consumer may then receive the incentive for conducting a transaction with one of the plurality of merchants located nearby the merchant. In other examples, the incentive can be sent substantially simultaneously with the notification.

In various examples, the service-computing device can determine that the plurality of merchants are nearby the merchant based upon a geolocation associated with respective merchant devices. The respective geolocations can be determined based on a global positioning system (GPS) signal from a GPS subsystem in the respective merchant devices, and/or by non-GPS location services. Additionally or alternatively, the respective geolocations can be determined based on location information stored to a merchant profile on the service-computing device. In some examples, such as for brick and mortar restaurants, a fixed location may be stored in the merchant profile. In other examples, mobile merchants may indicate a mobile nature of their business in the merchant profile. The mobile merchant may update the location information upon establishing a connection with the service-computing device and/or the service-computing device may query the merchant device, such as via a merchant application, for location information of the mobile merchant. Based on the updated location, the service-computing device may then identify merchants nearby a merchant.

In various examples, the classification of being nearby can be based on two merchants being within a threshold distance of one another. The threshold distance may be determined based on various factors involved in an order pick-up, such as traffic, congestion, a number of orders being processed by the system at a given time, etc. As such, the threshold distance may be measured based on city blocks, kilometers, miles, or other type of distance measurement. For example, in a large city, a threshold distance may be 2 city blocks. Conversely, in a small city, the threshold distance may be 10 city blocks.

In some examples, the classification of being nearby can be based on one of the plurality of merchants being along a delivery route from the merchant to the first consumer. In such examples, the service-computing device may calculate the delivery route between the first consumer and the merchant in which the first consumer indicates interest. The service-computing device may identify the second merchant to be along one of the one or more the delivery route, thereby enabling a combination of orders to increase the logistical efficiency of delivery.

In some examples, the service-computing device may calculate more than one delivery route from the merchant to the first consumer. In such examples, the classification of whether merchants are nearby can be based on a threshold time difference between the delivery routes. For example, a first route may have no additional merchants along it, but may be faster than a second route by 3 minutes. A second merchant may be located along the second route, and thus while longer, may be a fastest delivery route to combine orders while only increasing the delivery time by a few minutes.

At 708, the service-computing device receives a first order to conduct a first transaction with the merchant from the first consumer device. The service-computing device can receive the first order at an order processing module, such as order processing module 126. In various examples, the order processing module can receive payment information from the first consumer and process the payment with a service provider. In some examples, the order processing module can access a consumer profile associated with the first consumer, and can process payment via payment information stored in the consumer profile. The order processing module can further access a merchant profile associated with the transaction to credit payment to the merchant that prepares the order. In various examples, the order processing module can save the order information to a consumer profile and/or a merchant profile. In such examples, the service-computing device may track consumer preferences and/or popular items sold by the merchant. The preferences and/or popular items may subsequently be used by the service-computing device to incentivize future transactions.

At 710, the service-computing device receives a second order to conduct a second transaction with a second merchant from the second consumer device. The service-computing device can receive the second order at the order processing module. In various examples, the order processing module can receive payment information from the second consumer and process the payment with a service provider. In some examples, the order processing module can access a consumer profile associated with the second consumer, and can process payment via payment information stored in the consumer profile. The order processing module can further access a merchant profile associated with the transaction to credit payment to the merchant that prepares the order. In various examples, the order processing module can save the order information to a consumer profile and/or a merchant profile. In such examples, the service-computing device may track consumer preferences and/or popular items sold by the merchant. The preferences and/or popular items may subsequently be used by the service-computing device to incentivize future transactions.

At 712, the service-computing device associates the first order with the second order. In some examples, the first order and the second order can be associated based on the respective consumer devices being within a threshold distance of one another. In some examples, the association can result in a combined order, the combined order indicating respective consumers, respective merchants, respective order information, a delivery route, etc. In various examples, the combined order can be based at least in part on the first consumer associated with the first order being nearby the second consumer associated with the second order.

At 714, the service-computing device sends the combined order to a courier. The service-computing device can send the delivery order to the courier via a courier device connected to the service-computing device via a network connection. The delivery order can include details regarding each transaction to specify that the first good is to be delivered to the first consumer and the second good to the second consumer.

At 716, the service-computing device initiates a delivery of a first good to a first consumer and a second good to a second consumer. The service-computing device can initiate the delivery of the respective goods by ensuring an acceptance of the delivery task by a courier assigned to the delivery. Based on the acceptance, the courier can pick up the respective orders from the respective merchants and deliver the respective goods to the respective consumers. Though described as merely a first transaction and a second transaction, the service-computing device can combine a plurality of transactions and send the data to a single courier for delivery.

Figure 8:
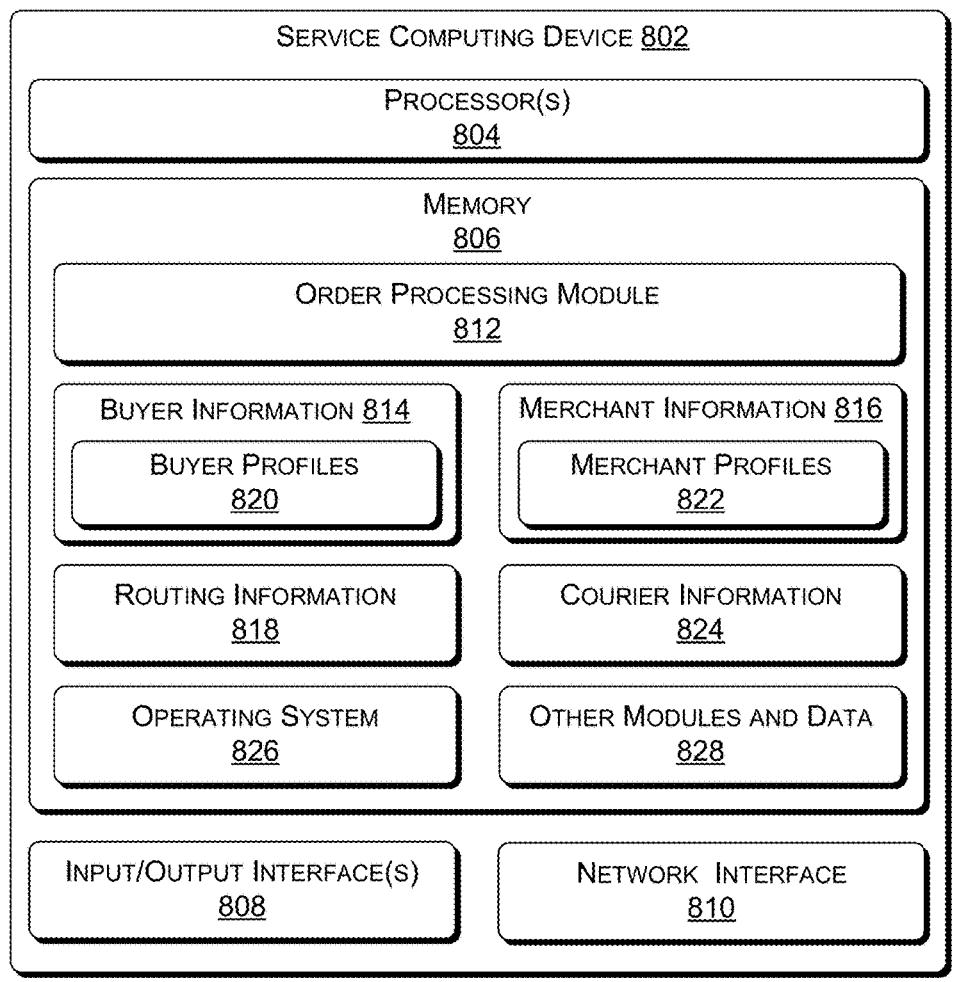
FIG. 8 illustrates a service-computing device to be used in a system for incentivizing combined deliveries to increase logistical efficiency.

FIG. 8 illustrates select example components of an example service-computing device 802 according to some implementations. The service-computing device 802 can be any suitable type of computing device, e.g., mobile, semi-mobile, semi-stationary, or stationary. The service-computing device 802 can belong to a variety of categories or classes of devices such as traditional server-type devices, desktop computer-type devices, mobile devices, special purpose-type devices, embedded-type devices, and/or wearable-type devices. Thus, service-computing device 802 can include a diverse variety of device types and are not limited to a particular type of device. For example, the service-computing device 802 can represent, but is not limited to, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device capable of sending communications and performing the functions according to the techniques described herein.

In the illustrated example, the service-computing device 802 includes at least one processor 804, at least one memory 806, one or more input/output (I/O) interfaces 808, one or more network interfaces 810. Each processor 804 can itself comprise one or more processors or processing cores. For example, the processor 804 can be implemented as one or more microprocessors, microcomputers, microcontrollers, digital signal processors, central processing units, state machines, logic circuitries, and/or any devices that manipulate signals based on operational instructions. In some cases, the processor 804 can be one or more hardware processors and/or logic circuits of any suitable type specifically programmed or configured to execute the algorithms and processes described herein. The processor 804 can be configured to fetch and execute computer-readable processor-executable instructions stored in the memory 806.

Depending on the configuration of the service-computing device 802, the memory 806 can be an example of tangible non-transitory computer storage media and can include volatile and nonvolatile memory and/or removable and non-removable media implemented in any type of technology for storage of information such as computer-readable processor-executable instructions, data structures, program modules or other data. The memory 806 can include, but is not limited to, RAM, ROM, EEPROM, flash memory, solid-state storage, magnetic disk storage, optical storage, and/or other computer-readable media technology. Further, in some cases, the service-computing device 802 can access external storage, such as RAID storage systems, storage arrays, network attached storage, storage area networks, cloud storage, or any other medium that can be used to store information and that can be accessed by the processor 804 directly or through another computing device or network. Accordingly, the memory 806 can be computer storage media able to store instructions, modules or components that can be executed by the processor 804. Further, when mentioned, non-transitory computer-readable media exclude media such as energy, carrier signals, electromagnetic waves, and signals per se.

The memory 806 can be used to store and maintain any number of functional components that are executable by the processor 804. In some implementations, these functional components comprise instructions or programs that are executable by the processor 804 and that, when executed, implement operational logic for performing the actions and services attributed above to the service-computing device 802. Functional components of the service-computing device 802 stored in the memory 806 can include an order processing module 812, discussed above.

The order processing module 812 can receive an indication of interest in a merchant from a first buyer. The order processing module 812 can access buyer information 814, merchant information 816, and/or routing information 818 to identify a second buyer located nearby (e.g., within a threshold distance of and/or along a delivery route to) the first buyer. The order processing module 812 can cause a display of one or more merchant representations on a second buyer device based at least in part on the identification of the second buyer nearby the first buyer. The order processing module 812 can receive orders for purchases from the first buyer and the second buyer. Based on the first and second buyers being nearby one another and the respective merchants from which the first and second buyer ordered also being nearby one another, the order processing module 812 can enable the service-computing device 802 to combine orders to increase the logistical efficiency in delivery.

In various examples, functional components of the service-computing device 802 stored on the memory 806 can include the buyer information 814, with one or more buyer profiles 820, merchant information 818, with one or more merchant profiles 822, and courier information 824. In some examples, the buyer information 814 and the merchant information 818 can continually update buyer profiles 820 and merchant profiles 822, respectively, based on indications of interest, orders placed, and the like. Similarly, the courier information 824 can be updated based upon received information related to a courier, such as a willingness to participate in combined orders, a rating by the merchant of the courier, a rating by the buyer of the courier, etc.

Additional functional components can include an operating system 826 for controlling and managing various functions of the service-computing device 802. The memory 806 can also store other modules and data 828, which can include programs, drivers, etc., and the data used or generated by the functional components, to enable the combination of orders for increasing logistical efficiency of deliveries. Further, the service-computing device 802 can include many other logical, programmatic and physical components, of which those described are merely examples that are related to the discussion herein. In addition, the memory 806 can also store data, data structures and the like, that are used by the functional components. For example, this data can include item information that includes information about the items offered by the merchant, which can include images of the items, descriptions of the items, prices of the items, and so forth.

The I/O interface(s) 808, can include speakers, a microphone, a camera, and various user controls (e.g., buttons, a joystick, a keyboard, a keypad, etc.), a haptic output device, and so forth. The one or more network interface(s) 810 can include one or more interfaces and hardware components for enabling communication with various other devices over the network or directly. For example, network interface(s) 810 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 11 illustrates select example components of an example buyer device 902 according to some implementations. The buyer device 902 can be any suitable type of computing device, e.g., mobile, semi-mobile, semi-stationary, or stationary. Some examples of the buyer device 902 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the buyer device 902 includes at least one processor 904, at least one memory 906, a display 908, a global positioning system (GPS) subsystem 910, one or more network interfaces 912, and one or more input/output (I/O) interfaces 1010. Each processor 904 can itself comprise one or more processors or processing cores. For example, the processor 904 can be implemented as one or more microprocessors, microcomputers, microcontrollers, digital signal processors, central processing units, state machines, logic circuitries, and/or any devices that manipulate signals based on operational instructions. In some cases, the processor 904 can be one or more hardware processors and/or logic circuits of any suitable type specifically programmed or configured to execute the algorithms and processes described herein. The processor 904 can be configured to fetch and execute computer-readable processor-executable instructions stored in the memory 906.

Depending on the configuration of the buyer device 902, the memory 906 can be an example of tangible non-transitory computer storage media and can include volatile and nonvolatile memory and/or removable and non-removable media implemented in any type of technology for storage of information such as computer-readable processor-executable instructions, data structures, program modules or other data. The memory 906 can include, but is not limited to, RAM, ROM, EEPROM, flash memory, solid-state storage, magnetic disk storage, optical storage, and/or other computer-readable media technology. Further, in some cases, the buyer device 902 can access external storage, such as RAID storage systems, storage arrays, network attached storage, storage area networks, cloud storage, or any other medium that can be used to store information and that can be accessed by the processor 904 directly or through another computing device or network. Accordingly, the memory 906 can be computer storage media able to store instructions, modules or components that can be executed by the processor 904. Further, when mentioned, non-transitory computer-readable media exclude media such as energy, carrier signals, electromagnetic waves, and signals per se.

The memory 906 can be used to store and maintain any number of functional components that are executable by the processor 904. In some implementations, these functional components comprise instructions or programs that are executable by the processor 904 and that, when executed, implement operational logic for performing the actions and services attributed above to the buyer device 902. Functional components of the buyer device 902 stored in the memory 906 can include a buyer application 916, discussed above. The buyer application 916 can present an interface on the buyer device 902 to enable the buyer to indicate and interest in and/or conduct a transaction with a merchant. Further, the buyer application 916 can present an interface to enable the buyer to manage a buyer profile. Additional functional components can include an operating system 918 for controlling and managing various functions of the buyer device 902 and for enabling basic user interactions with the buyer device 902.

In addition, the memory 906 can store data, data structures and the like, that are used by the functional components. For example, this data can include item information that includes information about the items offered by the merchant, which can include images of the items, descriptions of the items, prices of the items, and so forth. Depending on the type of the buyer device 902, the memory 906 can also optionally include other functional components and data 920, which can include programs, drivers, etc., and the data used or generated by the functional components. Further, the buyer device 902 can include many other logical, programmatic and physical components, of which those described are merely examples that are related to the discussion herein.

Figure 9:
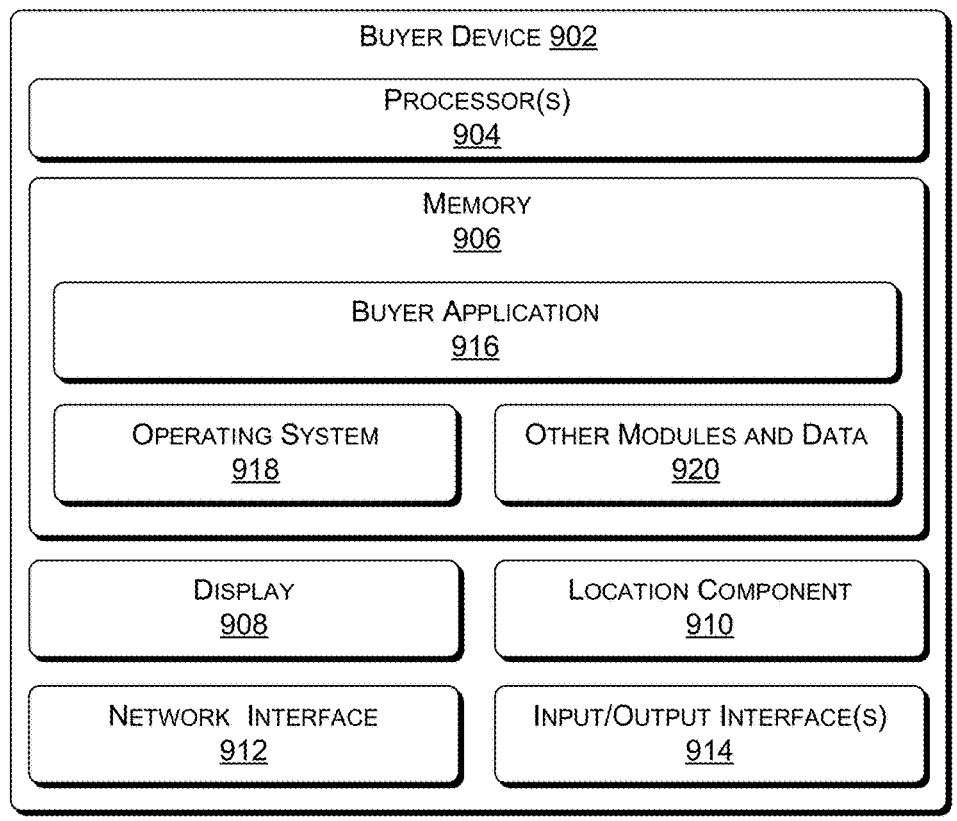
FIG. 9 illustrates a consumer-computing device to be used in a system for incentivizing combined deliveries to increase logistical efficiency.

FIG. 9 further illustrates that the buyer device 902 can include the display 908 mentioned above. Depending on the type of computing device used as the buyer device 902, the display 908 can employ any suitable display technology. For example, the display 908 can be a liquid crystal display, a plasma display, a light emitting diode display, an OLED (organic light-emitting diode) display, an electronic paper display, or any other suitable type of display able to present digital content thereon. In some examples, the display 908 can have a touch sensor associated with the display 908 to provide a touchscreen display configured to receive touch inputs for enabling interaction with a graphical user interface presented on the display 908. Accordingly, implementations herein are not limited to any particular display technology.

In various examples, the location component 910 can include a GPS subsystem including a device to provide location information. In some examples, the location component 910 can comprise a non-GPS based location-based sensor. The buyer device 902 can also include one or more additional sensors (not shown), such as an accelerometer, gyroscope, compass, proximity sensor, and the like. Additionally, the buyer device 902 can include various other components that are not shown, examples of which include removable storage, a power control unit, and so forth.

The one or more network interface(s) 912 can include one or more interfaces and hardware components for enabling communication with various other devices over the network or directly. For example, network interface(s) 912 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The I/O interfaces 914, meanwhile, can include speakers, a microphone, a camera, and various user controls (e.g., buttons, a joystick, a keyboard, a keypad, etc.), a haptic output device, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
receiving, by a server via a network and from a first consumer device executing a first instance of a recommendation application, an indication of interest in a merchant and an indication of a first geolocation of the first consumer device, the first geolocation being determined by a first global positioning system (GPS) system of the first consumer device;
receiving, by the server via the network and from a second consumer device executing a second instance of the recommendation application, an indication that the second consumer device is executing the second instance of the recommendation application and an indication of a second geolocation of the second consumer device, the second geolocation being determined by a second GPS system of the second consumer device;
determining that a distance between the first geolocation and the second geolocation is less than a threshold distance;
based at least in part on determining that the distance is less than the threshold distance, causing a presentation of a representation of the merchant on a display of the second consumer device, the representation including a good offered by the merchant;
causing a presentation of a first incentive to conduct a first transaction with the merchant on a display of the first consumer device;
causing a presentation of a second incentive to conduct a second transaction with the merchant on the display of the second consumer device;
receiving, from the first consumer device via the network, a first order of a first good offered by the merchant;
receiving, from the second consumer device via the network, a second order of a second good offered by the merchant;
applying the first incentive to the first order;
applying the second incentive to the second order;
creating an association between the first order and the second order based at least in part on determining that the distance is less than the threshold distance;
generating, by the server, a combined order based at least in part on the association between the first order and the second order;
sending, via the network, the combined order to the merchant;
and sending, via the network, data associated with the combined order to a courier service to initiate delivery of the first good to a first consumer associated with the first consumer device and the second good to a second consumer associated with the second consumer device.

2. The method as claim 1 recites, wherein the merchant comprises a first merchant and further comprising:
causing a presentation of a second representation of a second merchant on the display of the second consumer device based at least in part on a consumer profile associated with the second consumer, wherein a geolocation associated with the second merchant is within a threshold distance of a geolocation associated with the first merchant.

3. The method as claim 1 recites, wherein the merchant comprises a first merchant and further comprising:
accessing a consumer profile associated with the second consumer, the consumer profile indicating a previous transaction between the second consumer and a second merchant;
determining that a geolocation associated with the second merchant is within a threshold distance of a geolocation associated with the second merchant; and
ranking the first merchant and the second merchant based at least in part on preference data stored in the consumer profile,
wherein the causing the presentation of the representation of the first merchant on the display of the second consumer device is based at least in part on the first merchant being ranked higher than the second merchant.

4. The method as claim 1 recites, wherein the combined order indicates respective consumers, respective items purchased, and respective delivery locations for the first order and the second order.

5. The method as claim 1 recites, wherein the merchant comprises a first merchant, the method further comprising:
   determining that a second merchant is a preferred merchant of the second consumer; and
   determining that a second distance between the first merchant and the second merchant is less than a threshold merchant distance,
   wherein the second incentive is an incentive to conduct the second transaction with the second merchant, and the receiving the second order comprises receiving the second order for a second good offered by the second merchant, and
   wherein the sending the combined order comprises sending the first order to the first merchant and the second order to the second merchant.

6. The method as claim 1 recites, further comprising determining that a travel time between the first geolocation and the second geolocation is within a threshold time and wherein the causing the presentation of the first incentive and causing the presentation of the second incentive is based at least in part on determining that the travel time is within the threshold time.

7. The method as claim 1 recites, wherein the indication of interest in the merchant comprises at least one of:
   a selection of a like button;
   a selection of a thumbs up icon; or
   a selection of an order button.

8. A system comprising:
   one or more processors; and
   one or more non-transitory computer-readable media storing instructions executable by the one or more processors, wherein the instructions program the one or more processors to perform acts comprising:
      receiving, via a network and from a first consumer device executing a first instance of a recommendation application, an indication of interest in a merchant and an indication of a first geolocation of the first consumer device, the first geolocation being determined by a first global positioning system (GPS) system of the first consumer device;
      receiving, via the network and from a second consumer device executing a second instance of the recommendation application, an indication that the second consumer device is executing the second instance of the recommendation application and an indication of a second geolocation of the second consumer device, the second geolocation being determined by a second GPS system of the second consumer device;
      determining that a distance between the first geolocation and the second geolocation is less than a threshold distance;
      based at least on the distance being less than the threshold distance, causing a presentation of a representation of the merchant on a display of the second consumer device, the representation including a good offered by the merchant;
      causing a presentation of a first incentive to conduct a first transaction with the merchant on a display of the first consumer device;
      causing a presentation of a second incentive to conduct a second transaction with the merchant on the display of the second consumer device;
      receiving, from the first consumer device, a first order of a first good offered by the merchant;
      receiving, from the second consumer device, a second order of a second good offered by the merchant;
      applying the first incentive to the first order;
      applying the second incentive to the second order;
      creating an association between the first order and the second order based at least in part on determining that the distance is less than the threshold distance;
      generating a combined order based at least in part on the association between the first order and the second order;
      sending, via the network, the combined order to the merchant; and
      sending, via the network, data associated with the combined order to a courier service to initiate delivery of the first good to a first consumer associated with the first consumer device and the second good to a second consumer associated with the second consumer device.

9. The system as claim 8 recites, wherein the merchant comprises a first merchant and the acts further comprising:
   causing a presentation of a second representation of a second merchant on the display of the second consumer device based at least in part on a consumer profile associated with the second consumer, wherein a geolocation associated with the second merchant is within a threshold distance of a geolocation associated with the first merchant.

10. The system as claim 8 recites, wherein the merchant comprises a first merchant and the acts further comprise:
   accessing a consumer profile associated with the second consumer, the consumer profile indicating a previous transaction between the second consumer and a second merchant;
   determining that a geolocation associated with the second merchant is within a threshold distance of a geolocation associated with the second merchant; and
   ranking the first merchant higher than the second merchant based at least in part on preference data stored in the consumer profile,
   wherein the causing the presentation of the representation of the first merchant on the display of the second consumer device is based at least in part on the first merchant being ranked higher than the second merchant.

11. The system as claim 8 recites, wherein the combined order indicates respective consumers, respective items purchased, and respective delivery locations for the first order and the second order.

12. The system as claim 8 recites, wherein the merchant comprises a first merchant, the acts further comprising:
   determining that a second merchant is a preferred merchant of the second consumer; and
   determining that a second distance between the first merchant and the second merchant is less than a threshold merchant distance,
   wherein the second incentive is an incentive to conduct the second transaction with the second merchant, and the receiving the second order comprises receiving the second order for a second good offered by the second merchant, and
   wherein the sending the combined order comprises sending the first order to the first merchant and the second order to the second merchant.

13. The system as claim 8 recites, wherein the acts further comprise determining that a travel time between the first geolocation and the second geolocation is within a threshold time and wherein the causing the presentation of the first incentive and causing the presentation of the second incentive is based at least in part on determining that the travel time is within the threshold time.

14. A server computing device comprising:
one or more processors; and
one or more non-transitory computer-readable media storing instructions executable by the one or more processors, wherein the instructions program the one or more processors to perform acts comprising:
receiving, via a network and from a first consumer device executing a first instance of a recommendation application, an indication of interest in a merchant and an indication of a first geolocation of the first consumer device, the first geolocation being determined by a first global positioning system (GPS) system of the first consumer device;
receiving, via the network and from a second consumer device executing a second instance of the recommendation application, an indication that the second consumer device is executing the second instance of the recommendation application and an indication of a second geolocation of the second consumer device, the second geolocation being determined by a second GPS system of the second consumer device;
determining that a distance between the first geolocation and the second geolocation is less than a threshold distance;
based at least on the distance being less than the threshold distance, causing a presentation of a representation of the merchant on a display of the second consumer device, the representation including a good offered by the merchant;
causing a presentation of a first incentive to conduct a first transaction with the merchant on a display of the first consumer device;
causing a presentation of a second incentive to conduct a second transaction with the merchant on the display of the second consumer device;
receiving, from the first consumer device, a first order of a first good offered by the merchant;
receiving, from the second consumer device, a second order of a second good offered by the merchant;
applying the first incentive to the first order;
applying the second incentive to the second order;
creating an association between the first order and the second order based at least in part on determining that the distance is less than the threshold distance;
generating a combined order based at least in part on the association between the first order and the second order;
sending, via the network, the combined order to the merchant; and
sending, via the network, data associated with the combined order to a courier service to initiate delivery of the first good to a first consumer associated with the first consumer device and the second good to a second consumer associated with the second consumer device.

15. The server computing device as claim 14 recites, wherein the merchant comprises a first merchant and the acts further comprise:
causing a presentation of a second representation of a second merchant on the display of the second consumer device based at least in part on a consumer profile associated with the second consumer, wherein a geolocation associated with the second merchant is within a threshold distance of a geolocation associated with the first merchant.

16. The server computing device as claim 14 recites, wherein the merchant comprises a first merchant and the acts further comprise:
accessing a consumer profile associated with the second consumer, the consumer profile indicating a previous transaction between the second consumer and a second merchant;
determining that a geolocation associated with the second merchant is within a threshold distance of a geolocation associated with the second merchant; and
ranking the first merchant and the second merchant based at least in part on preference data stored in the consumer profile,
wherein the causing the presentation of the representation of the first merchant on the display of the second consumer device is based at least in part on the first merchant being ranked higher than the second merchant.

17. The server computing device as claim 14 recites, wherein the combined order indicates respective consumers, respective items purchased, and respective delivery locations for the first order and the second order.

18. The server computing device as claim 14 recites, wherein the merchant comprises a first merchant and the acts further comprise:
determining that a second merchant is a preferred merchant of the second consumer; and
determining that a second distance between the first merchant and the second merchant is less than a threshold merchant distance,
wherein the second incentive is an incentive to conduct the second transaction with the second merchant, and the receiving the second order comprises receiving the second order for a second good offered by the second merchant, and
wherein the sending the combined order comprises sending the first order to the first merchant and the second order to the second merchant.

19. The server computing device as claim 14 recites, wherein the acts further comprise determining that a travel time between the first geolocation and the second geolocation is within a threshold time and wherein the causing the presentation of the first incentive and causing the presentation of the second incentive is based at least in part on determining that the travel time is within the threshold time.

20. The server computing device as claim 14 recites, wherein the indication of interest in the merchant comprises at least one of:
a selection of a like button;
a selection of a thumbs up icon; or
a selection of an order button.

* * * * *